(12) United States Patent
Frattarelli et al.

(10) Patent No.: US 10,336,935 B2
(45) Date of Patent: Jul. 2, 2019

(54) LOW TEMPERATURE STABILIZED FOAM-FORMING COMPOSITION FOR ENHANCED OIL RECOVERY

(71) Applicant: Dow Global Technologies LLC, Midland, MI (US)

(72) Inventors: David L. Frattarelli, Pottstown, PA (US); Sayeed Abbas, Pearland, TX (US); Troy E. Knight, Missouri City, TX (US); Aaron W. Sanders, Missouri City, TX (US); Christopher J. Tucker, Midland, MI (US); Caroline Woelfle-Gupta, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 315 days.

(21) Appl. No.: 14/780,228

(22) PCT Filed: May 22, 2014

(86) PCT No.: PCT/US2014/039145
§ 371 (c)(1),
(2) Date: Sep. 25, 2015

(87) PCT Pub. No.: WO2014/193731
PCT Pub. Date: Dec. 4, 2014

(65) Prior Publication Data
US 2016/0083642 A1    Mar. 24, 2016

Related U.S. Application Data

(60) Provisional application No. 61/829,512, filed on May 31, 2013.

(51) Int. Cl.
*C09K 5/00* (2006.01)
*C09K 8/584* (2006.01)
(Continued)

(52) U.S. Cl.
CPC .............. *C09K 8/584* (2013.01); *C09K 8/594* (2013.01); *E21B 43/168* (2013.01)

(58) Field of Classification Search
None
See application file for complete search history.

(56) References Cited

U.S. PATENT DOCUMENTS

| 4,367,169 A | 1/1983 | Matsushita et al. |
| 4,380,266 A | 4/1983 | Wellington |

(Continued)

FOREIGN PATENT DOCUMENTS

GB    1225218    3/1971

*Primary Examiner* — Necholus Ogden, Jr.

(57) ABSTRACT

This invention relates to a foam-forming composition having good low temperature stability and method of use thereof for enhanced oil recovery. Said foam-forming composition comprises an anionic sulfonate surfactant, preferably an alpha-olefin sulfonate, a alkyl ether solvent, and water and is preferably stable to at least −5 C. A preferred alkyl ether solvent has the formula $C_8H_{18}O_3$, $C_8H_{16}O_3$, or mixtures thereof. Preferred alpha-olefin sulfonate have 10 to 18 carbons, preferably 12 carbons. A preferred method for recovering oil from a reservoir comprises the periodic injection of gas and said foam-forming composition into the reservoir and contacting the oil in the reservoir with the foam so as to assist in the recovery of oil from the reservoir.

8 Claims, 1 Drawing Sheet

(51) Int. Cl.
  *C09K 8/594*  (2006.01)
  *E21B 43/16*  (2006.01)

(56) References Cited

U.S. PATENT DOCUMENTS

| | | |
|---|---|---|
| 4,860,828 A | 8/1989 | Oswald et al. |
| 5,502,538 A | 3/1996 | Ogasawara |
| 6,852,221 B2 | 2/2005 | Smolley |

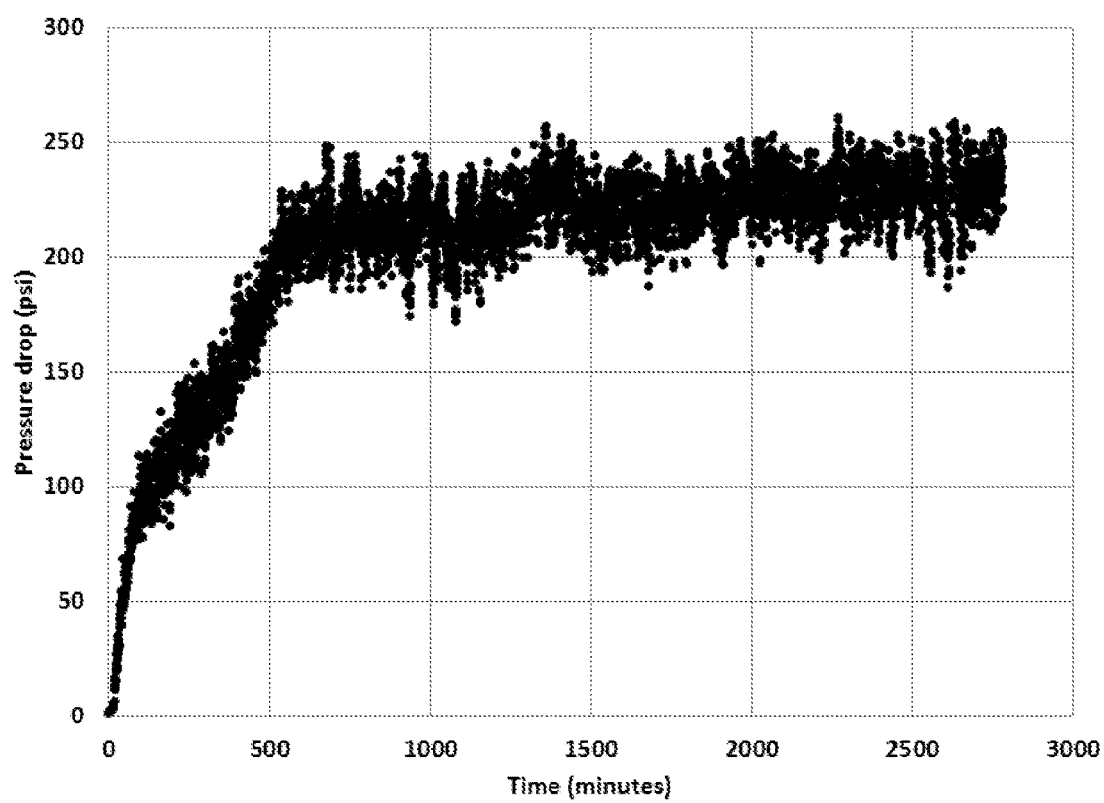

LOW TEMPERATURE STABILIZED FOAM-FORMING COMPOSITION FOR ENHANCED OIL RECOVERY

FIELD OF THE INVENTION

This invention relates to a low temperature stabilized foam-forming composition and method of use thereof for enhanced oil recovery. Specifically, the low temperature stabilized foam-forming composition comprises an alpha-olefin sulfonate, an alkyl ether solvent, and water. Preferably the alkyl ether solvent is a $C_8H_{18}O_3$ and/or $C_8H_{16}O_3$ solvent in an amount of from 10 to 60 weight percent.

BACKGROUND OF THE INVENTION

The present invention relates to a composition and method for enhancing the recovery of petroleum from an oil-bearing formation. In the recovery of oil from reservoirs, the use of primary production techniques (i.e., the use of only the initial formation energy to recover the crude oil) followed by the secondary technique of waterflooding, recovers only a portion of the original oil present in the formation. Moreover, the use of certain enhanced oil recovery (EOR) techniques is also known in the art. One such technique is a gas-drive method wherein a gas, such as carbon dioxide, is used to facilitate the recovery of oil.

Surfactants are well known for their use as foaming agents in enhanced oil recovery techniques. See, for example, U.S. Pat. No. 4,380,266 to Wellington, U.S. Pat. No. 4,860,828 to Oswald et al. and U.S. Pat. No. 5,502,538 to Wellington et al. One purpose of foam is to divert the flow of the drive-gas into that portion of the formation containing high oil saturation.

Useful surfactants for enhanced oil recovery are alpha-olefin sulfonate surfactants. Generally, an "alpha-olefin sulfonate" is a mixture containing a hydroxyalkane monosulfonate, an alkene monosulfonate and a small amount of an alkene disulfonate. Each of these components further contains several types of structural isomers. The mixture is recognized as an alpha-olefin sulfonate (AOS) in the surfactant industry.

While alpha-olefin surfactants are largely known as "good foamers", they are also known to suffer from numerous stability issues. For example, solubility is limited when employing alpha-olefin surfactants having longer chain lengths, i.e., greater than about $C_{10}$, by the amount of salt in the injection water or formation brine. Another drawback relates to transportation, use, and/or storage of aqueous alpha-olefin sulfonates at low temperatures; reduced solubility at low temperatures often results in alpha-olefin sulfonate solutions becoming turbid.

Since each of the components of the alpha-olefin sulfonate has a different crystallization point, the alpha-olefin sulfonate causes turbidity where the component having the highest crystallization point is first allowed to precipitate as crystals at low temperatures. Once it causes white turbidity, the alpha-olefin sulfonate is unlikely to be easily returned again to a transparent state. Phase separation can result in high viscosity and/or gelling problems.

It is well known that adding a hydrotrope (a compound possessing the ability to increase the water-solubility of an organic compound) to a detergent may improve its stability. For example, alpha-olefin compositions comprising alkali metal salts, ammonium salts, or organic base salts of an alkyl- or alkenyl polyglycol ether carboxylic acid to an alpha-olefin sulfonate having 8 to 20 carbon atoms are disclosed in GB 1,225,218. Alpha-olefin compositions comprising substituted fatty acid amido component and a sulfonated hydrotrope component are taught in U.S. Pat. No. 3,852,221. U.S. Pat. No. 4,367,169 discloses alpha-olefin compositions comprising a pyridine salt. While it is well know that adding such hydrotropes to aqueous surfactant compositions may depress the freezing point of the water, they may not necessarily improve the stability of the surfactant compositions at low temperatures to a sufficient extent.

Accordingly, it is desirable to provide aqueous surfactant compositions, especially aqueous AOS compositions, which have good stability at low temperatures; for example, at −5° C. or lower in winter in accordance with storage and use conditions.

SUMMARY OF THE INVENTION

The present invention is such an aqueous anionic surfactant foaming solution for use in an enhanced oil recovery process comprising (i) one or more alpha-olefin sulfonate (AOS), (ii) a solvent having the chemical formula $C_8H_{18}O_3$, $C_8H_{16}O_3$, or mixtures thereof, and (iii) water.

Preferably in the aqueous anionic surfactant foaming solution disclosed herein above, the solvent has an octanol-water partitioning constant of from 0.05 to 0.8.

Preferably in the aqueous anionic surfactant foaming solution disclosed herein above, the solvent is present in an amount of from 10 weight percent to 60 weight percent, weight percent based on the total weight of the AOS and solvent.

Preferably in the aqueous anionic surfactant foaming solution disclosed herein above, the solvent is:

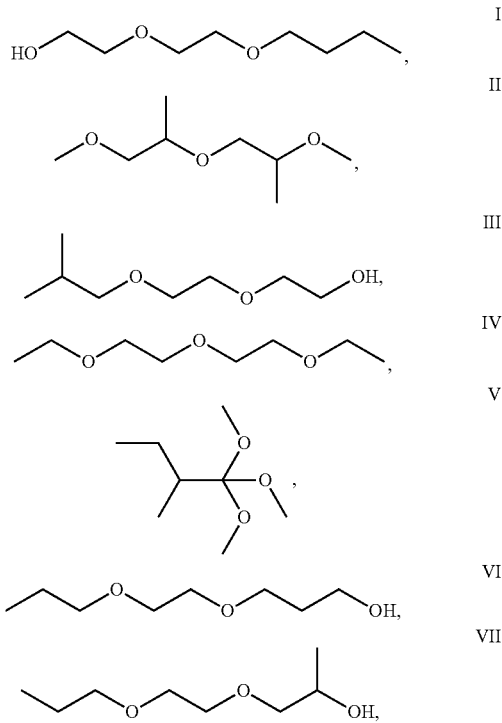

or mixtures thereof.

Preferably in the aqueous anionic surfactant foaming solution disclosed herein above, the one or more alpha-olefin sulfonate has 10 to 18 carbons, more preferably 12 carbons.

Preferably in the aqueous anionic surfactant foaming solution disclosed herein above, the one or more alpha olefin sulfonate comprises both hydroxy-sulfonates and alkene-sulfonates.

Another embodiment of the present invention is a method of recovering oil from a reservoir during gas injection into said reservoir comprising the steps of: (a) at least periodically injecting gas and a foam-forming composition into a reservoir wherein the foam-forming composition comprises an aqueous anionic surfactant foaming solution comprising: (i) one or more alpha-olefin sulfonate, (ii) a solvent having the chemical formula $C_8H_{18}O_3$, $C_8H_{16}O_3$, or mixtures thereof, and (iii) water and (b) contacting hydrocarbons in the reservoir with the foam and the gas so as to assist in the recovery of hydrocarbons from the reservoir.

Preferably, in the method disclosed herein above, the anionic surfactant foaming solutions is added to/diluted with an aqueous diluent at the well head so that the AOS is present in the down-hole aqueous diluent in an amount of from 0.0001 to 2 weight percent.

BRIEF DESCRIPTION OF THE DRAWING

FIG. 1 illustrates a graphical representation of the Time vs. Pressure drop for Example 6 and the rise in pressure drop over time indicates formation of foam in the core.

DETAILED DESCRIPTION OF THE PREFERRED EMBODIMENTS

The aqueous anionic surfactant foaming solution of the present invention is an aqueous alpha-olefin sulfonate (AOS) solution comprising one or more alpha-olefin sulfonate. Alpha-olefin sulfonates useful in the practice of this invention are those which are derived from alpha-olefins having from about 10 to 18 carbon atoms, preferably about 14 to 16 carbon atoms, most preferably 12 carbon atoms. The olefins may be linear, branched or alicyclic with linear olefins being preferred. Methods to produce AOS are well known, for example AOS may be synthesized by the reaction of the alpha-olefins with sulfur trioxide. This reaction may be conducted according to methods well-known in the chemical arts typically by contact of a flow of dilute sulfur trioxide vapor with a thin film of liquid olefin at a temperature in the range of from about 5° C. to about 50° C. The reaction between the $SO_3$ and the olefin yields an intermediate, believed to be in the nature of a sultone which is subsequently hydrolyzed by reaction with water and neutralized by reaction with a base. Mixtures of AOS are useful in the practice of this invention.

The AOS suitable for the present invention may comprise, for example, a $C_{10-18}$ AOS composition. In as far as AOS compositions typically include a combination of sulfonate components, by "$C_{10-12}$" it is meant that an alpha-olefin sulfonate includes one or more of $C_{10}$ alpha-olefin sulfonate and $C_{12}$ alpha-olefin sulfonate. Similarly, by "$C_{10-14}$" it is meant that the alpha-olefin sulfonate composition includes one or more alpha-olefin sulfonates having a chain length of 10 to 14 carbon atoms. Similarly, by "$C_{10-18}$" it is meant that the alpha-olefin sulfonate composition includes one or more alpha-olefin sulfonates having a chain length of 10 to 18 carbon atoms.

A preferred AOS composition of the present invention comprises a $C_{12}$ AOS due to its foamability and because it is soluble in brines containing up to 18 weight percent total dissolved solids (TDS) at room temperature (within the range of 22° C. to 24° C.).

The choice of the particular AOS composition to be employed in the present invention depends on balancing foamability against brine tolerance in the desired environment. Foamability increases with the length of the carbon chain whereas, brine tolerance decreases. See, for example, U.S. Pat. No. 4,769,730 to Suzuki. Accordingly, the particular additional AOS composition is selected based upon the certain practical factors, i.e., cost, salinity of the injection water, and the oil-bearing formation in which it is to be employed.

AOS typically includes both hydroxy-sulfonates and alkene-sulfonates. The hydroxy sulfonates include both 3-hydroxy and 4-hydroxy sulfonates while the alkene-sulfonates include alkene-1-sulfonates (alkene-1), alkene-2-sulfonates (alkene-2), alkene-3-sulfonates (alkene-3), alkene-4-sulfonates (alkene-4), alkene-5-sulfonates (alkene-5), alkene-6-sulfonates (alkene-6), alkene-7-sulfonates (alkene-7) and alkene-8-sulfonates (alkene-8). Alkene-di sulfonates can also be present in the AOS.

The aqueous anionic surfactant foaming composition of the present invention comprises one or more AOS, a solvent, optional other surface active agents, and water. Preferably, the AOS is present in an amount equal to or greater than 10 weight percent, preferably equal to or greater than 16 weight percent, and more preferably equal to or greater than 22 weight percent, weight percent based on the total weight of aqueous anionic surfactant foaming composition. Preferably, the AOS is present in an amount equal to or less than 40 weight percent, preferably equal to or less than 36 weight percent, and more preferably equal to or less than 30 weight percent, weight percent based on the total weight of aqueous anionic surfactant foaming composition.

The aqueous anionic surfactant foaming solution of the present invention is stabilized by an effective amount of an alkyl ether solvent. The alkyl ether solvent provides one or more stabilizing effects to the aqueous AOS solution. In one embodiment, the alkyl ether solvent aids in solubilizing the AOS in an aqueous solution, especially at low temperatures. In another embodiment, the alkyl ether solvent reduces phase separation of the AOS from aqueous components of the solution.

Suitable alkyl ether solvents may comprise linear alkyl chains, branched alkyl chains, or a mixture of linear and branched alkyl chains and may be protic, comprising one or more hydroxyl group (—OH) and/or aprotic having no —OH groups. Alkyl ether solvents having a carbon:oxygen ratio (C:O) between 2.3 and 3.25 are particularly effective in solubilizing AOS in aqueous solutions. Eight carbon alkyl ether solvents with the chemical formulas $C_8H_{18}O_3$ and $C_8H_{16}O_3$ and having a C:O of 2.66 are particularly useful in stabilizing the AOS aqueous solutions of the present invention.

Regarding phase separation, we have found alkyl ether solvents with an octanol-water partitioning constant between 0.05 and 0.8 are useful in reducing the phase separation of aqueous AOS solutions. The octanol-water partitioning constant (Kow) reflects the hydrophobicity-hydrophilicity of a compound and is the ratio of concentrations of a compound in a mixture of two immiscible phases at equilibrium. These coefficients are a measure of the difference in solubility of the compound in these two phases.

Any structural isomer of $C_8H_{18}O_3$ and $C_8H_{16}O_3$ and having a C:O of 2.66 falls within the scope of the present invention. Particularly useful $C_8H_{18}O_3$ alkyl ether solvents for use in the present invention are 2-(2-butoxyethoxy) ethanol (I); bis(methoxypropyl)ether; (II); 2-[2-(2-methylpropoxy)ethoxy]ethanol (III); 1-ethoxy-2-(2-ethoxyethoxy)

ethane (IV); 1,1,1-trimethoxy-2-methylbutane (V); 3-(2-propoxyethoxy)propan-1-ol (VI); 1-(2-propoxyethoxy)propan-1-ol (VII); and mixtures thereof. These solvent are represented by the following structures:

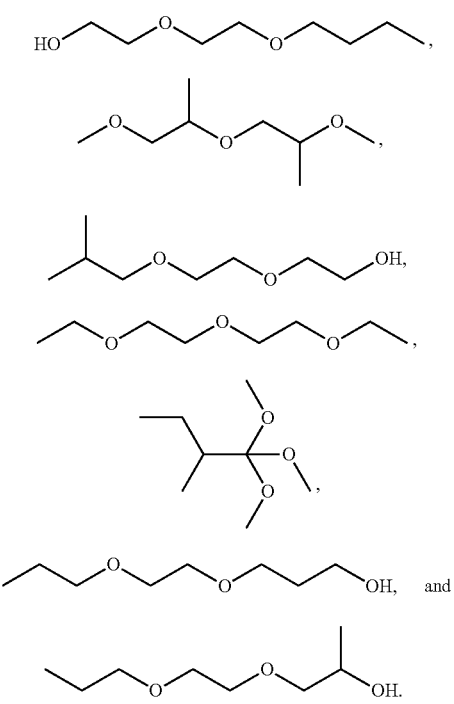

An effective amount of alkyl ether solvent to stabilize an aqueous AOS solution will vary depending on, to name a few, the composition of the AOS (e.g., the carbon chain length), the aqueous medium, and the target temperature at which the solution is to be stabilized.

Preferably, the alkyl ether solvent is present in an amount equal to or greater than 10 weight percent, preferably equal to or greater than 15 weight percent, and more preferably equal to or greater than 20 weight percent, weight percent based on the total weight of the aqueous anionic surfactant foaming composition. Preferably, the alkyl ether solvent is present in an amount equal to or less than 60 weight percent, preferably equal to or less than 50 weight percent, and more preferably equal to or less than 40 weight percent, weight percent based on the total weight of the aqueous anionic surfactant foaming composition.

The foam-forming composition of the present invention may also contain minor amounts of other surface active agents. For example, co-surfactants such as amphoteric surfactants, as well as scale inhibitors, such as AOS dimers and chelating agents, may be present. The total amount of these additional surface active agents is preferably not greater than about 10 percent by weight of the total weight of the aqueous anionic surfactant foaming composition.

The balance of the aqueous anionic surfactant foaming composition of the present invention that is not an AOS, a solvent, or an optional other surface active agents is water.

Preferably, the aqueous anionic surfactant foaming composition is stable to −5° C., more preferably to −10° C., more preferably to −15° C., and most preferably to −20° C.

In using the aqueous anionic surfactant foaming composition of the present invention for the enhanced recovery of oil, the aqueous anionic surfactant foaming composition is added to and diluted with the down-hole aqueous diluent. The foam may either be preformed or formed "in situ" (e.g., through introduction of alternate slugs of gas and foam-forming composition into the formation). In either method, any of the procedures recognized in the art for injecting a foam into a formation may be employed. Moreover, although the composition of the oil-bearing formation is not critical to the present invention, it finds particular utility in sandstone reservoirs.

It is to be understood by those skilled in the art that this composition can be used either in water-alternate-gas (WAG) mode or drive recovery methods under either miscible or immiscible conditions. For example, the aqueous anionic surfactant foaming composition of the present invention may be used in a method of recovering oil from a reservoir during gas injection into said reservoir comprising the steps of: at least periodically injecting gas and said foam-forming composition into a reservoir and contacting hydrocarbons in the reservoir with the foam and the gas so as to assist in the recovery of hydrocarbons from the reservoir.

The gas which can be employed includes any of those known in the art, e.g., carbon dioxide ($CO_2$), nitrogen ($N_2$), methane ($CH_3$), flue gas and the like or mixtures of hydrocarbons such as methane with any of ethane, propane, or butane, flue gas and the like.

The choice of aqueous diluent, generally referred to as water, is typically the produced water, e.g., from the reservoir, but the source may be different, based upon the requirements of the reservoir to be treated, economics, and compatibility of the composition upon dilution, for example fresh water, aquifer water, or reservoir brine produced from the well.

This invention will find particular applicability with brines having a TDS content of from about 0 up to 18 weight percent, preferably with 0 up to 15, and more preferably 0 up to 12 weight percent.

The aqueous anionic surfactant foaming composition of the present invention is added to/diluted with the aqueous diluent, for example at the well head, such that the amount of AOS surfactant in the down-hole aqueous diluent is from 0.0001 to 2 weight percent. Preferably, the amount of surfactant in the down-hole aqueous diluent is equal to or greater than 0.0001 weight percent, more preferably equal to or greater than 0.001 weight percent, more preferably equal to or greater than 0.01 weight percent, more preferably equal to or greater than 0.05 weight percent, and even more preferably equal to or greater than 0.08 weight percent.

Preferably the amount of AOS surfactant in the down-hole aqueous diluent is equal to or less than 2 weight percent, more preferably equal to or less than 1 weight percent, more preferably equal to or less than 0.5 weight percent, more preferably equal to or less than 0.3 weight percent, and even more preferably equal to or less than 0.1 weight percent.

EXAMPLES

A description of the raw materials used in the Examples is as follows.

| | |
|---|---|
| WITCONATE™ AOS-12 | is a $C_{12}$ AOS available from Akzo Nobel. |
| PROGLYDE™ DMM | Dipropylene glycol dimethyl ether available from The Dow Chemical Company. |

-continued

| | |
|---|---|
| Butyl Carbitol | is diethylene glycol monobutyl ether available from The Dow Chemical Company. |
| Diethylene Glycol Monobutyl Ether | is available from Sigma Aldrich. |
| 2,2,4-trimethyl-1,3-pentanediol | is available from Sigma Aldrich. |
| diethylene glycol monoethyl ether acetate | is available from Sigma Aldrich. |
| diethylene glycol diethyl ether | is available from Sigma Aldrich. |
| n-butyl lactate | is available from Sigma Aldrich. |
| diethylene glycol monopropyl ether | is available from Sigma Aldrich. |
| diethylene glycol dimethyl ether | is available from Sigma Aldrich. |
| triethylene glycol | is available from Sigma Aldrich. |

Stability at Low Temperature.

Pour point/phase behavior is determined at −20° C. on aqueous $C_{12}$ AOS solutions with and without an alkyl ether solvent (Example 1). Examples 2 to 16 comprise an aqueous $C_{12}$ AOS/solvent mixture, wherein the weight percent solvent is based on the total weight of the AOS and solvent mixture.

Pour point testing is performed using a 10 gram sample of Examples 1 through 16. Samples are stored in a low temperature box at −20° C. and periodically tested for flow and phase separation at 24 and/or 48 hours. Flow is determined either through turning the sample on its side to see if the meniscus shifts or by turning the samples upside to watch a metal BB pass from the bottom to the top of the sample. Phase separation is determined by visual inspection as well (e.g. precipitation, complete phase separation (2 phases), cloudiness, etc).

The compositions and stability results for Examples 1 to 10 are shown in Table 1.

TABLE 1

| Example | Solvent | Concentration, wt % | Solvent C:O | Solvent Kow | Flow | Phase Separation | Time, hr |
|---|---|---|---|---|---|---|---|
| 1* | none | NA | NA | NA | No | Yes | 24 |
| 2 | dipropylene glycol dimethyl ether | 35 | 2.66 | 0.35 | Yes | No | 48 |
| 3 | dipropylene glycol dimethyl ether | 58 | 2.66 | 0.35 | Yes | No | 48 |
| 4 | diethylene glycol monobutyl ether | 57 | 2.66 | 0.29 | Yes | No | 48 |
| 5 | diethylene glycol monobutyl ether | 37 | 2.66 | 0.29 | No | No | 48 |
| 6 | diethylene glycol monobutyl ether | 40 | 2.66 | 0.29 | Yes | No | 48 |
| 7 | diethylene glycol diethyl ether | 40 | 2.66 | 0.39 | Yes | Yes | 48 |
| 8 | diethylene glycol diethyl ether | 50 | 2.66 | 0.39 | Yes | Yes | 48 |
| 9 | diethylene glycol monoisobutyl ether | 40 | 2.66 | 0.54 | No | No | 48 |
| 10 | diethylene glycol monoisobutyl ether | 50 | 2.66 | 0.54 | Yes | Yes | 48 |
| 11* | 2,2,4-trimethyl-1,3-pentanediol | 50 | 4 | 1.24 | No | No | 48 |
| 12* | diethylene glycol monoethyl ether acetate | 50 | 2 | 0.32 | No | Yes | 48 |
| 13* | n-butyl lactate | 50 | 2.3 | 1.01 | No | Yes | 48 |
| 14* | diethylene glycol monopropyl ether | 50 | 2.3 | 0.2 | No | Yes | 48 |
| 15* | diethylene glycol dimethyl ether | 50 | 2 | −0.23 | No | Yes | 48 |
| 16* | triethylene glycol | 50 | 1.5 | −1.26 | No | Yes | 48 |

*not an Example of the present invention

Foam Testing.

Foam formation response testing is performed with a Model 6100 Formation Response Tester (FRT) available from Chandler Engineering. The FRT has one core holder which is used for performing these experiments. For the formation response testing a single core holder is used containing a single core comprising Berea sandstone available from Kocurek Industries measuring 1.5 inch diameter and 12 inch long having 115 mD permeability to 1% sodium chloride brine. The core is wrapped in SARAN™ WRAP and then placed inside a respective AFLAS™ 90 rubber sleeve which is inserted into the Hassler-type core holder. The confining pressure of the core is maintained at approximately 500 psi above the internal pressure. The core is heated to the desired temperature before fluids are injected. The fluids are preheated to the core temperature prior to injection to minimize heating and cooling effects in the core. A differential pressure transducer is used to measure pressure drop across core up to 50 psi. Pressure drops exceeding 50 psi across the core are measured as a difference between the cell inlet and cell outlet pressure transducers.

The core is saturated with 4513 ppm of Example 6 dissolved in brine solution. The foam formation response is performed under the following conditions: Mode of injection: co-injection; brine flow rate: 0.091 ml/min; $CO_2$ flow rate: 0.529 ml/min; foam quality: 85.3%; temperature: 126° F.; backpressure regulator: 1750 psi; 1000 ppm surfactant concentration in brine; 1808 ppm of solvent; and brine composition: 0.858% NaCl, 0.066% $CaCl_2$, and 0.02% $MgCl_2$ dissolved in fresh water.

The testing is performed in the co-injection mode where the brine and $CO_2$ are simultaneously co-injected at the desired rates. Under these conditions an equilibrium pressure drop is obtained across the core. Typically a minimum of 8-12 hours is provided for steady state to be obtained. The pressure drop versus time for Example 6 is shown in FIG. 1.

The rise in pressure drop over time indicates the formation of foam in the core.

What is claimed is:

1. A method of recovering hydrocarbons from a reservoir during gas injection into the reservoir for enhanced oil recovery, the method comprising:
   (a) at least periodically injecting a gas and a foam-forming composition into a reservoir, the foam-forming composition including an aqueous anionic surfactant foaming solution comprising:
      (i) one or more alpha-olefin sulfonate (AOS),
      (ii) a solvent having the chemical formula $C_8H_{18}O_3$, $C_8H_{16}O_3$, or mixtures thereof, the solvent being present in an amount from 30 weight percent to 60 weight percent, based on a total weight of the aqueous anionic surfactant foaming solution, and
      (iii) water; and
   (b) contacting hydrocarbons in the reservoir with the gas and foam formed using the foam-forming composition to assist in recovering the hydrocarbons from the reservoir.

2. The method of claim 1 wherein the solvent has an octanol-water partitioning constant of from 0.05 to 0.8.

3. The method of claim 1 wherein the solvent is

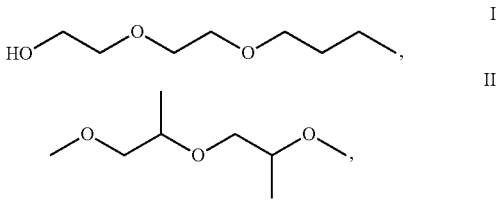

-continued

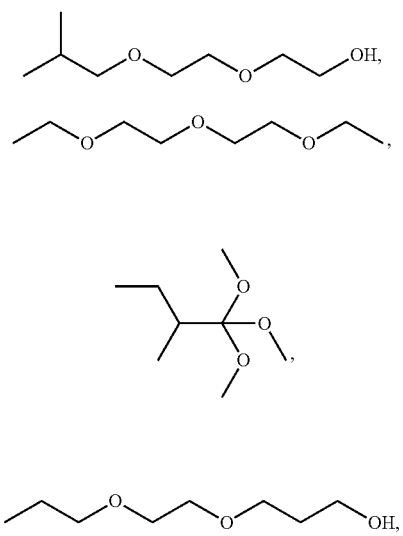

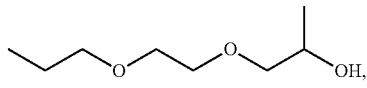

or mixtures thereof.

4. The method of claim 1 wherein the one or more alpha-olefin sulfonate has 10 to 18 carbons.

5. The method of claim 1 wherein the one or more alpha olefin sulfonate comprises both hydroxy-sulfonates and alkene-sulfonates.

6. The method of claim 1 wherein the one or more alpha olefin sulfonate has 12 carbons.

7. The method of claim 1 wherein the amount of the solvent is from 35 weight percent to 60 weight percent, based on the total weight of the aqueous anionic surfactant foaming solution.

8. The method of claim 1 wherein the amount of the solvent is from 35 weight percent to 50 weight percent, based on the total weight of the aqueous anionic surfactant foaming solution.

* * * * *